Feb. 25, 1969   J. M. LAUER   3,429,796

GAS ANALYZER

Filed Sept. 16, 1965

INVENTOR.
JAY M. LAUER
BY Samuel Lindenberg
ATTORNEY

United States Patent Office 3,429,796
Patented Feb. 25, 1969

3,429,796
GAS ANALYZER
Jay M. Lauer, Torrance, Calif., assignor to Analytic Systems Company, Pasadena, Calif., a corporation of California
Filed Sept. 16, 1965, Ser. No. 487,745
U.S. Cl. 204—195     12 Claims
Int. Cl. B01k 3/02; B01l 5/00

ABSTRACT OF THE DISCLOSURE

An electrochemical gas analyzer is disclosed. The analyzer is formed of an insulator body having an open recess. The side and bottom walls of the recess form a container which is lined with conductive metal foil. The container is filled with granules of a nonpolarizable metal such as lead to form an anode. The cathode comprises a thin flat nonwoven mesh of a polarizable metal such as silver which covers the opening of the cell and a gas-permeable, electrolyte-impermeable membrane is spread over the cathode. An aqueous potassium hydroxide electrolytic solution fills the container until the inner surface of the cathode mesh is wetted.

Background of the invention

*Field of the invention.*—This invention relates to electrochemical gas analyzers, and more particularly to improvements therein.

*Description of the prior art.*—The construction of electrochemical gas analyzers of the type, for example, which is employed to detect the amount of oxygen which is present in a gas mixture usually takes the form of a container for an electrolyte in which there is placed a cathode and an anode spaced therefrom. The materials which are selected are such that when a gas such as oxygen diffuses into the electrolyte adjacent to the cathode, ions are formed which flow through the main body of the electrolyte to the anode. When the circuit is completed externally, this provides a measurable current flow, the magnitude of which varies with the amount of oxygen present.

In the construction of these gas analyzers heretofore, provision has always been made to cause the gas to be analyzed to flow through the cell and over the cathode using a gas inlet and outlet opening in the cell. Since the gas moving through the cell can carry away some of the electrolyte which is present, provision has also had to be made for replenishing the lost electrolyte.

The lifetime of these gas analyzers is usually limited by a number of factors, the most significant of which is the electrochemically available surface area of the anode. Since the cost of these cells is high, it is desirable to make these cells last as long as possible.

Objects and summary of the invention

An object of the invention is the provision of a construction for a gas analyzer which has an increased lifetime.

Another object of the present invention is the provision of a sealed gas analyzer which enables gas to be introduced therein while eliminating gas flow openings.

Still another object of this invention is to provide a construction for a gas analyzer which has a sufficiently linear output to drive standard meters and recorders without recourse to amplifiers of any kind.

Yet another object of this invention is the provision of a unique construction for gas analyzers which does not require replenishment of the electrolyte.

These and other objects of the invention are achieved in an arrangement for a gas detection cell wherein one of the electrodes, such as the anode, is located within a recess of the cell body and comprises a conductive metal cup filled with granules of a nonpolarizable metal. The other electrode comprises a planar mesh of another metal, which is polarizable and which covers the opening within the cell body. The mesh is made sufficiently thin to provide a minimum polarizable surface area consistant with output requirements. An electrolyte fills the recess until the surface of the cathode mesh which is adjacent to the interior of the recess is wetted. The upper surface of the mesh is wetted by the electrolyte being drawn thereto by the capillary action of the mesh openings. Spread over the mesh and sealing off the recess is a membrane made of a material, which is pervious to air but does not permit a significant flow of the electrolyte therethrough. Accordingly, the gas to be analyzed will pass into the cell through this membrane but there is no loss of liquid from within the cell. Because of the unusual construction of the anode, which consists of granular metal particles there is a greater electrochemically useful anode area, which provides for a longer cell life. The porous cathode reduces the internal resistance of the cell to substantially zero by providing a "line of sight" path for the flow of ions from the cathode to the anode, resulting in more linear output. Because of the use of a flat mesh cathode, the speed of the response of the cell is increased since only a very thin film of electrolyte is maintained between the membrane and the upper surface of the flat mesh cathode.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
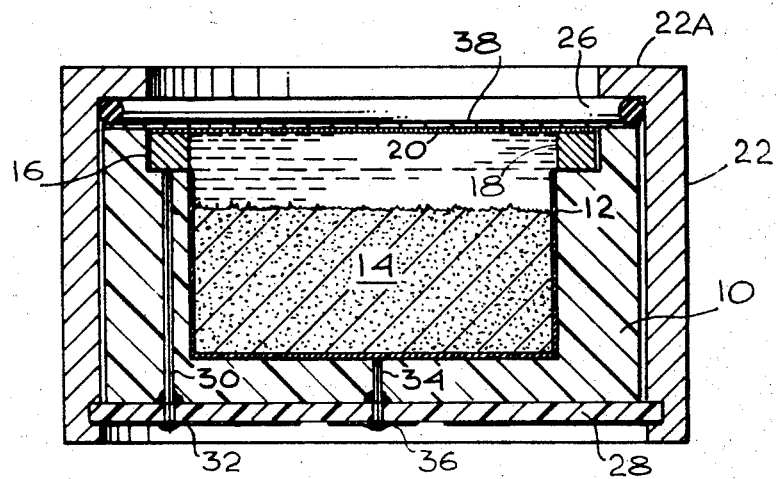
FIGURE 1 is a view in cross-section of an embodiment of the invention.

Referring now to FIGURE 1, which is a cross-sectional view of an embodiment of the invention, the cell construction comprises a cup-shaped body 10 which may be made of insulating material such as polyethylene. The walls of the recess within the body 10 are lined with a conductive metal 12, which, by way of example, may be half mil stainless steel foil.

The cup is then filled with granular lead particles 14. By way of illustration and not as a limitation, particles having a size of between five and ten mils may be used. The lead is treated to remove its oxide coating. This may be done by placing the lead granules in a 10% solution of boiling potassium hydroxide. The temperature is high enough to cause the lead to sinter under pressure. As a result of the foregoing anode construction, it should be appreciated that an anode is presented having a very high effective electrochemical area.

Provision is made for a circular groove 16 around the top of the recess wherein there is placed a conductive metal ring 18, which may be made of a metal, such as brass. A cathode 20 is resistance welded to the brass ring to be supported thereby.

Figure 2:
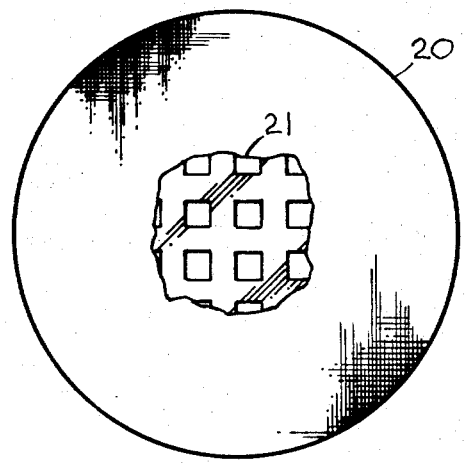
FIGURE 2 is a view in elevation of the cathode construction.

As may be seen from the enlarged mesh section 21 shown in FIGURE 2, the cathode comprises a flat or planar metal mesh as opposed to a metal mesh made of woven wire, as in customarily the case. The use of this type of mesh allows the membrane to come in intimate contact with the metal mesh resulting in rapid response to changes in oxygen concentrations. The mesh must be a metal which can be resistance welded to the support ring 18. The mesh and the brass ring are then silver plated. A deposition of between 0.2 and 0.3 mil of silver is applied. The metal deposited or plated need not be silver but should be a metal that provides an easily polarizable surface. By way of example, in an embodiment of the invention which was built, the mesh had 250 lines per inch and 15% of the mesh constituted open area.

The recess or cup in which the anode granules have been placed is completely filled with the electrolyte which may be any suitable electrolyte such as an aqueous solution of potassium hydroxide. This solution completely covers over the lead particles, fills the space between the lead granules and the cathode, and contacts the lowermost side of the cathode. The liquid, by capillary action, passes through the openings in the cathode and then wets the top surface with a thin film. The membrane 38 then provides a liquid tight seal over the recess of the cell body. This membrane has the property that it is porous to the gas and not to the electrolyte. Teflon or polyethylene are illustrative of materials having these properties.

The sealed cell body is enclosed in a suitably shaped container 22 which is open at the top and the bottom. A terminal disc 28, preferably made of fiberglass epoxy, fits against the bottom of the cell body and into a suitable slot in the container walls. The container has an inward extending flange 22A between the inside of which and the top of the membrane there is placed an O-ring 26 to provide pressure against the seal and the terminal disc, sealing the region between the top of the cup and the insides of the housing. Openings are provided in the body 10 to enable a platinum lead 30 to extend from the cathode assembly therethrough and another opening is provided in board 28 to enable the lead 30 to extend to a cathode terminal foil 32. Another platinum lead 34 extends through similarly provided openings from the anode assembly to an anode terminal foil 36.

Accordingly, the cell structure permits the gas to be analyzed to freely pass through the membrane and through a thin film of electrolyte to the cathode to act on the cathode-electrolyte interface and to produce a depolarizing current in proportion to the amount of gas reaching the cathode. Because of the porous and thin nature of the cathode the ionic product of reaction can travel freely therethrough with a minimum resistance. The anode undergoes a simultaneous reaction and is consumed in the process. Because of the particulate nature of the anode, the anode has a greater useful electrochemical area. This provides the cell with a longer life which is only limited by the amount of anode metal contained within the cell.

There has accordingly been described and shown a novel, useful and unique construction for a gas analyzing cell, which enables long maintenance-free life, low internal cell resistance, fast response and recovery and requires no amplification or external power sources to provide linear outputs sufficient to drive commercially available meters, recorders, etc.

I claim:

1. An electrochemical cell for the determination of the concentration of a gas in a gaseous mixture comprising walls defining a container having one side open, a liner of conductive metal lining the inner walls of the container, a first electrode comprising a plurality of granular metal particles of a nonpolarizable metal within said lined container in contact with said lined walls, a second electrode comprising flat, printed lines forming a planar metal, nonwoven mesh, said mesh being sufficiently thin to be easily polarizable and sufficiently porous to furnish minimal internal resistance, means supporting said metal mesh over the opening of said container, an electrolyte in said container covering said metal particles and to a depth to reach the side of said metal mesh facing the interior of said container, said mesh having a surface which is polarizable by means of said first electrode, and means affording electrical connection to said first and second electrodes.

2. Apparatus as recited in claim 1 wherein said metal particles of said first electrode comprise lead particles, and the liner for said container comprises a conductive metal foil.

3. Apparatus as recited in claim 1 wherein said flat printed mesh comprises a resistance weldable core having a coating of silver plated thereover.

4. A cell for the determination of the concentration of gas in a gaseous mixture comprising a container for a body of electrolyte, an anode and a cathode positioned relative to said body of electrolyte to provide an electrically conductive fluid path therebetween, said anode comprising granular lead submerged within said electrolyte, the surface of the walls of said container which are in contact with said granular lead being made of a conductive metal, said cathode being made of a core of a flat planar nonwoven mesh of a resistance weldable metal covered with a coating of sliver, means supporting said cathode with a surface thereof in contact with the surface of said electrolyte, membrane means enclosing and sealing said container and cathode, said membrane means being position adjacent to said cathode and having the property that it is permeable to gas but not to said electrolyte, and means for affording electrical contact to said anode and cathode.

5. Apparatus as recited in claim 4 wherein said membrane is made of Teflon.

6. Apparatus as recited in claim 4 wherein said membrane is made of polyethylene.

7. A cell for the determination of the concentration of gas in a gaseous mixture comprising a body of an insulating material having an open recess forming a container having a bottom and side walls, a metal lining for the walls of said container, an anode including a plurality of lead particles within said container, an electrolyte covering said particles of metal, a flat planar cathode comprising a core of nonwoven mesh of a weldable metal having a coating of silver thereon, means supporting said cathode metal planar mesh over the top of said recess with one surface in contact with the surface of said electrolyte, said metal of said cathode being selected to be polarizable by means of the metal of said anode, a membrane, means supporting said membrane over the surface of said cathode metal planar mesh which is opposite to the one in contact with said electrolyte, said membrane having the property that it is pervious to the gas but impervious to the electrolyte, and means affording electrical connection to said cathode metal mesh and to said metal lining of said recess.

8. Apparatus as recited in claim 7 wherein said recess contains a circular groove at the inner upper surface thereof and a conductive metal cathode support ring supported in said groove.

9. Apparatus as recited in claim 8 wherein said mesh contains 250 lines to the inch and said mesh has an open area of about 15%.

10. Apparatus as recited in claim 8 wherin said ring and said mesh are coated with about 0.2 to 0.3 mil of silver.

11. In a cell for the determination of the concentration of a gas in a gaseous mixture comprising the combination of an anode, a cathode, a body of electrolyte establishing an electrically conductive fluid path joining said anode and said cathode, and a membrane pervious to the gas but impervious to the electrolyte supported over the surface of said cathode opposite to the surface in contact with the electrolyte the improvement comprises said cathode comprising flat printed lines froming a metal mesh, said metal mesh being sufficiently thin to be easily polarizable by the anode metal and sufficiently porous to furnish minimal internal resistance.

12. A cell as recited in claim 11 wherein said mesh comprises a weldable metal core having a coating of silver thereon.

References Cited

UNITED STATES PATENTS

| | | | |
|---|---|---|---|
| 2,805,191 | 9/1957 | Hersch | 204—195 |
| 3,028,317 | 4/1962 | Wilson et al. | 204—195 |
| 3,050,371 | 8/1962 | Dowson et al. | 204—195 |
| 3,239,444 | 3/1966 | Heldenbrand | 204—195 |
| 3,260,656 | 7/1966 | Ross | 204—1.1 |
| 3,272,725 | 9/1966 | Garst | 204—195 |
| 3,315,271 | 4/1967 | Hersch et al. | 204—195 |
| 3,322,662 | 5/1967 | Mackereth | 204—195 |

JOHN H. MACK, *Primary Examiner.*

T. TUNG, *Assistant Examiner.*

U.S. Cl. X.R.

204—1, 249